UNITED STATES PATENT OFFICE.

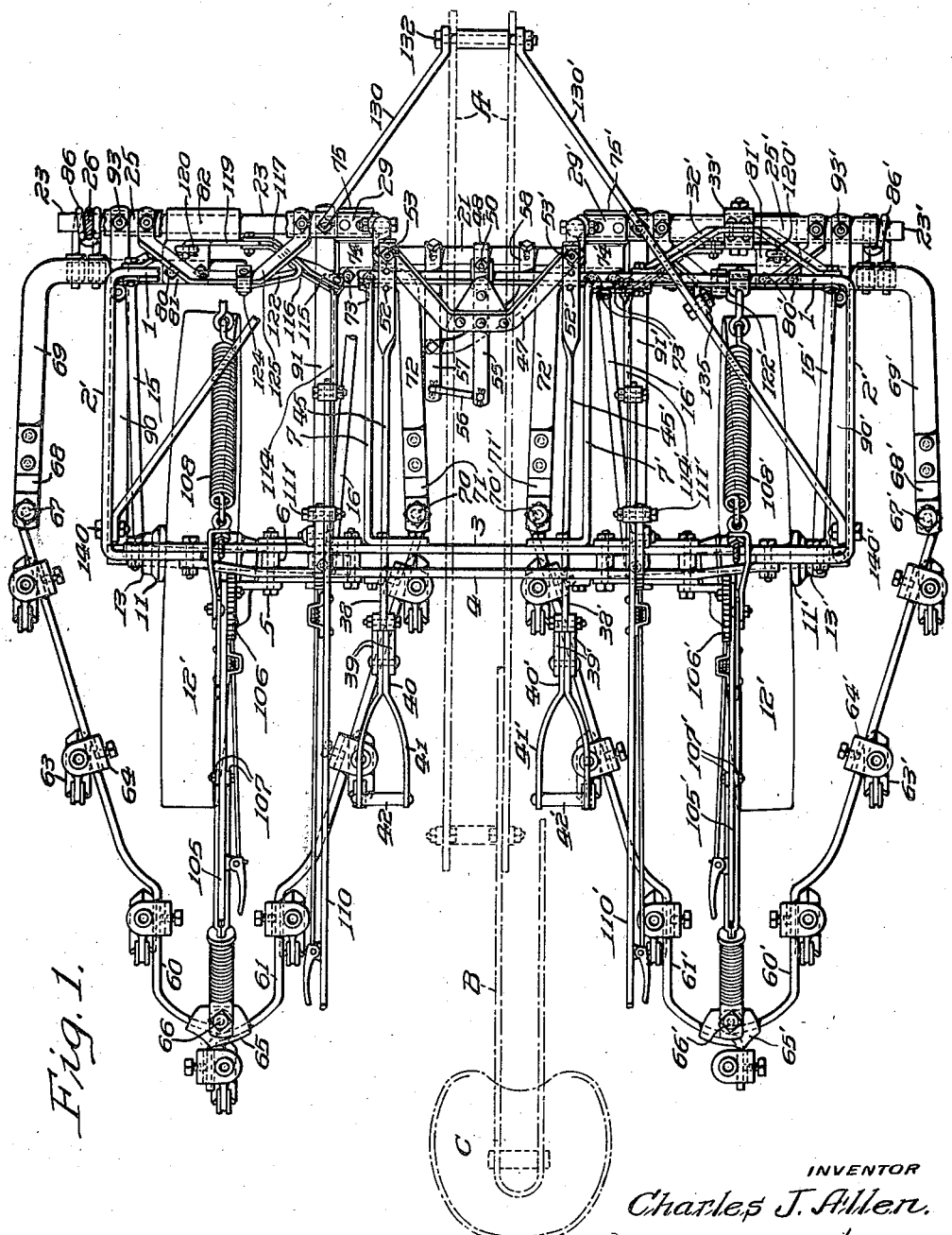

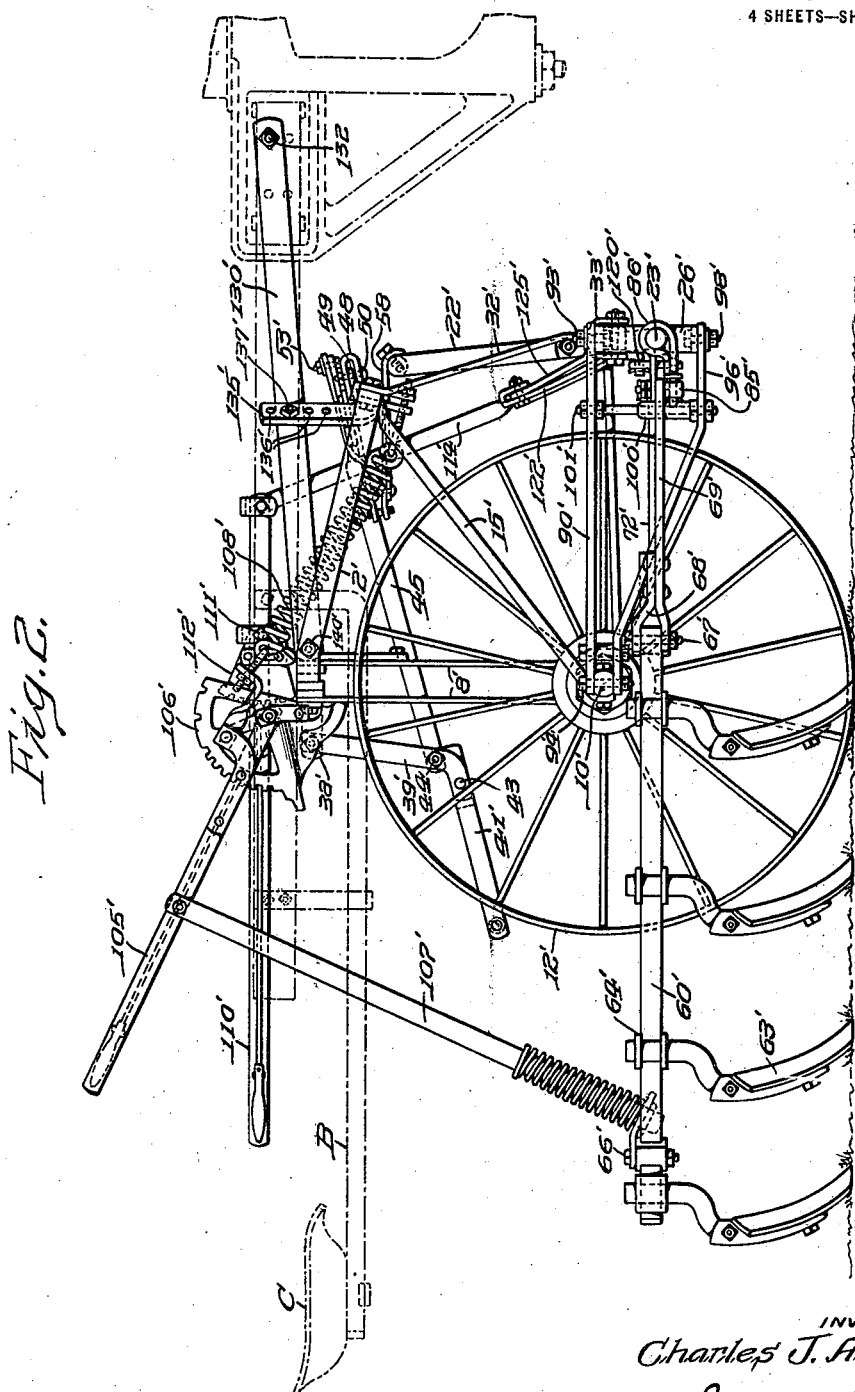

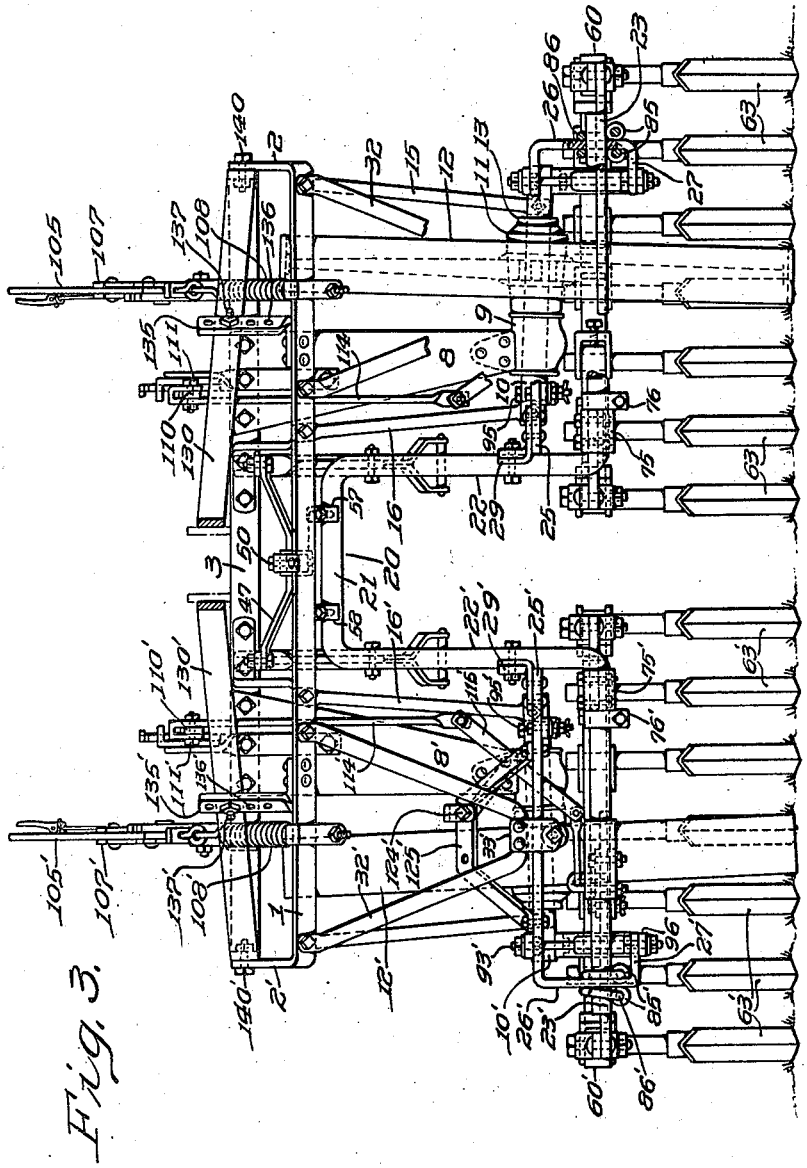

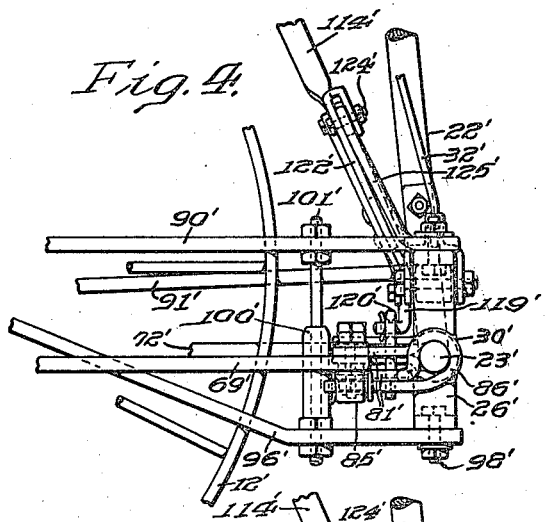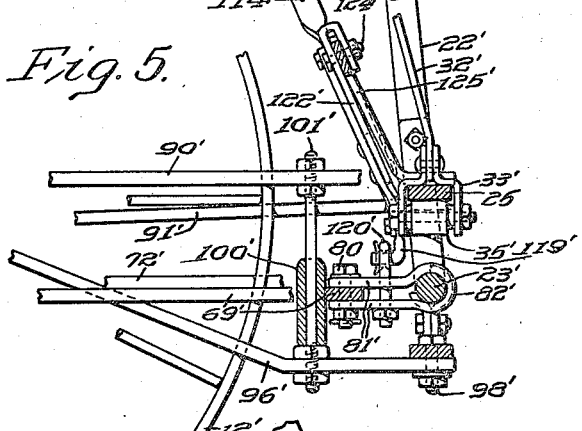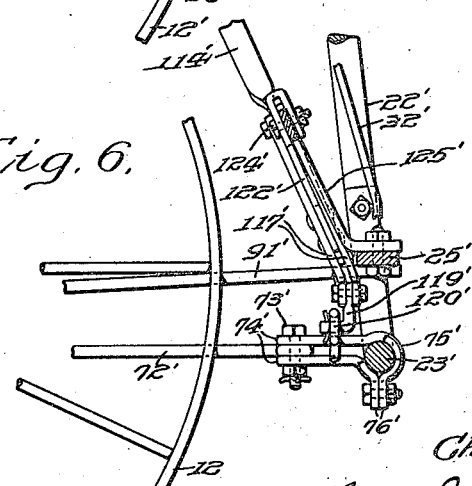

CHARLES J. ALLEN, OF MOORESTOWN, NEW JERSEY, ASSIGNOR TO S. L. ALLEN & CO., INC., A CORPORATION OF PENNSYLVANIA.

CULTIVATOR.

1,425,932.  Specification of Letters Patent.  Patented Aug. 15, 1922.

Application filed April 6, 1921. Serial No. 459,048.

*To all whom it may concern:*

Be it known that I, CHARLES J. ALLEN, a citizen of the United States, and a resident of Moorestown, in the county of Burlington and State of New Jersey, have invented certain new and useful Improvements in Cultivators, of which the following is a specification, reference being had to the accompanying drawings.

The invention relates to "two-row" cultivators, that is, cultivators adapted for the cultivation of the ground adjacent three rows of plants, the cultivation being simultaneously performed on both sides of the center row and on the adjacent side of each of the two outer rows, a principal object of the invention being to provide a machine of this character particularly suitable for use in connection with a farm tractor of the unstable type, that is, one embodying a pair of wheels and a rearwardly extending beam laterally movable with respect thereto and to which the cultivator is secured when in operation, although the use of the cultivator hereinafter described is not confined to a tractor of that character as any other suitable source of motive power may be employed for drawing the cultivator over the ground. With this end in view the cultivator is so designed and the various elements thereof arranged so that the draft is imparted to the gang bars to which the ground working tools are attached substantially in the horizontal plane of the bars and in their direction of movement as the machine is drawn over the ground, thus obviating the tendency of the forwardly positioned tools to dig into and the rearwardly positioned tools to work out of the ground which occurs when the draft is imparted to the gang bars in a direction other than substantially in the plane in which they are intended to move forward when the machine is in operation. In the present invention by reason of the aforesaid manner of imparting draft to the gang bars, the proper positioning of the latter is insured at all times and in consequence the desired adjusted depth of cut of all of the ground working tools properly maintained under operative conditions.

The invention further contemplates the provision in a cultivator of the general character aforesaid of means under the control of the operator for increasing and decreasing the distance between the members of each tool carrying gang, means for raising and lowering the gang and preferably foot controlled means whereby both gangs in any of their adjusted positions may be shifted to the right or left as desired so that by increasing or decreasing the distance between the members of each gang the area covered by each gang may be regulated while the machine is in motion to suit the requirements of varying rows while by suitable manipulation of the foot controlled means in combination therewith, the operator is enabled to cause the gangs to follow any sinuosities or curvatures in the rows without turning the tractor from its general direction of travel across the field. The invention further includes the provision of means for effecting vertical adjustment of the forward ends of the gang bars for regulating the depth of cut of the forward tools and their angle of entrance into the soil to better adapt the machine for use under varying conditions encountered in practice.

Other objects of the invention comprise various improvements in the form and construction of cultivating machines of this general character designed to render the machine as a whole both simple and durable in construction, effective in operation and capable of a wide range of adjustment to facilitate use of the machine under different operative conditions, said improvements, together with other novel objects and features of construction and arrangement, being hereinafter more particularly disclosed and claimed.

While in carrying out the objects of the invention such instrumentalities and combinations thereof may be employed as are effective for accomplishing the results desired, in the accompanying drawing is shown a preferred embodiment of means particularly adapted for that purpose, and as the preferred form of the invention illustrated is more particularly intended for utilization in connection with a farm tractor, I have, in the said drawings, shown in broken lines such parts of a typical tractor as may be of assistance in obtaining a proper understanding of the invention. However, it is not thereby desired or intended to in any way limit the employment of our improved cultivator with any particular form of tractor or other tractive means as it may be utilized in connection with any form of motive power suitable for drawing it over the ground.

In the accompanying drawings, Fig. 1 is a top plan view of a preferred embodiment of the invention showing the same operatively connected to a tractor beam; Fig. 2 a side elevation of the machine shown in Fig. 1 certain parts being removed for the sake of clearness, and Fig. 3 is a front elevation thereof also with certain parts broken away or removed for the sake of clearness. Figs. 4, 5 and 6 are respectively enlarged fragmentary views partially in side elevation and partially in vertical section illustrating certain details of construction. Like numerals are used to designate the same parts in the several views, and as the machine is substantially symmetrical with respect to its center line and comprises certain corresponding elements on both sides thereof, such elements have, as far as possible, been identically numbered with the addition of a prime (′) where such elements are on the left hand side of the center line of the machine when viewed as in Fig. 3. It will therefore be understood that when in the following description a given part is referred to by its number as, for example, "12", it is not thereby intended to designate only that part on the left hand side of the machine, but the corresponding part, if any, upon the right hand side thereof as well.

Referring now more particularly to the drawings, the form of the invention therein shown comprises a main frame having a transversely extending front member 1 and rearwardly and upwardly extending side members 2, which are directed inwardly at their rearmost extremities and secured to a transversely extending rear member 3. Preferably an additional rear member 4 is provided to extend transversely of the machine in the rear of and adjacent the member 3, being bolted thereto and separated therefrom by means of bolts 5 and spacer sleeves 6, the several parts being so arranged that the member 1 is normally somewhat below the level of the members 3 and 4. Braces 7 may also be disposed between the front and rear members to stiffen the frame if desired.

Rigidly connected to the rear members and depending therefrom are the axle supporting plates 8, adjacent the lower extremities of which are rigidly secured collars 9 through which extend, and which serve as a mounting for, the stub axles 10 upon which rotate the hubs 11 of the wheels 12, collars 13 on the outside of the hubs serving to hold the latter in position against the collars 9. As shown, the axles are slightly inclined forwardly and downwardly from their inner ends so that the wheels when mounted thereon are given a slight camber in a vertical plane and also "toe in" slightly toward the front. Extending upwardly and forwardly from the outer end of each axle is a brace 15 secured to the axle outside of the collar 13 and to the member 1 of the frame, while a substantially similar brace 16 extends upwardly and forwardly from the inner end of each axle and is also secured to the said member.

Positioned slightly in front of and depending below the frame member 1 and extending transversely of the machine in a substantially vertical plane is a supporting member conveniently in the form of a yoke 20 preferably formed from a single round bar of suitable diameter and having a central horizontal portion 21, vertically and downwardly depending portions 22 and laterally oppositely outwardly directed portions 23, the central portion 21 being positioned adjacent the frame member 1. Lateral movement of this yoke, through the medium of mechanism hereinafter described, is effective in the operation of the cultivator, to shift the gang bars to the right or left when desired.

For supporting the yoke and other parts carried thereby as hereinafter described, two slide bars are provided, each of these bars being preferably formed from flat stock and having a longitudinally extending portion 25, a vertically downwardly directed portion 26 and a reversely turned inwardly directed end 27 which lies beneath and in the plane of the portion 25. One of these slide bars is positioned above and spaced from each of the laterally directed portions of the yoke 20, the inner end of the slide bar being secured adjacent the vertically extending portion of the yoke in any convenient manner, as by an L-shaped clip 29 bolted to the slide bar and to the yoke, so that the portion 25 of the slide bar will lie in a substantially horizontal plane approximately parallel to the adjacent laterally directed portion of the yoke and with its greatest width in said plane. The vertically extending portion 26 of each slide bar is preferably slightly enlarged midway between its ends so as to form a boss 30 in which is provided an aperture for the passage of the adjacent end of the yoke thus forming a support therefor. It will be apparent, therefore, that the slide bars are operatively fixed to and movable with the yoke.

For supporting the weight of the slide bars and yoke from the frame suitable means are provided, preferably comprising hangers 32 conveniently formed of flat stock bent to a substantially V-shape and having their free ends rigidly secured to the frame member 1 in such position that the opposite end of each support will lie above and adjacent one of the slide bars, and to each support is rigidly secured a channel shaped clip 33 comprising ears embracing and extending below the slide bar to afford a bearing for the ends of a horizontally disposed axle on which is mounted a suitable antifriction roller 35, the upper surface of which engages the under surface of the slide bar, thereby supporting its weight without impeding its lateral movement.

In order to effect the lateral shifting of the yoke and the various parts carried thereby suitable, preferably foot controlled, means are provided, said means comprising, in the form of the invention illustrated, a pair of rearwardly extending brackets 38 suitably secured to any convenient portion of the main frame such as the member 4 and on opposite sides of the center line of the machine, to each of which is horizontally pivoted a downwardly depending link 39 preferably composed of a pair of complementary members located one on each side of the supporting bracket, each pair of said members adjacent their lower ends being directed rearwardly for a short distance and receiving between them the forward ends 40 of a stirrup 41. Each stirrup preferably comprises a pair of complementary side members adapted to receive between their rearmost extremities a foot rest 42, the members being drawn in at their front ends to contact with each other and engage between the members of one of the links 39 to which they are secured by a horizontal pivot bolt 43 passing through the lower ends of the members forming the adjacent link and through the stirrup, while extending forwardly from each of the links and connected thereto by a bolt 44 is another link 45. The rear end of each of these links 45 is positioned above the forward part of the adjacent stirrup in such manner that when the rear end of the stirrup is depressed the forward end thereof will be forced against the under side of the link as best shown in Fig. 2. The forward end of each of the links 45 is connected to one of the arms of a substantially horizontally positioned yoke 47 having a centrally forwardly projecting extension 48 pivoted preferably adjacent the frame member 1 on the center line of the machine. The pivoting means for this yoke may be arranged in any suitable or convenient manner preferably by providing a bracket 49 bolted to the frame member 1 and serving to support a pivot bolt 50 which passes through the extension 48 of the yoke, this extension being preferably doubled over on itself so as to receive a portion of the bracket as best shown in Fig. 2.

In order to provide means for adjusting the position of the stirrups, the forward end of each of the links 45 may preferably be provided with a plurality of holes 52 for the reception of the pivot bolt 53 which secures it to the yoke so that by selecting a suitable hole for the passage of the bolt the length of the link may be adjusted so as to bring the adjacent stirrup into different positions. The yoke 47 is also provided with a rearwardly extending arm 55 the outer end of which is connected by a short transversely disposed link 56 with the rear end of a forwardly extending arm 57 positioned on the left of the center line of the machine and secured adjacent its forward end to the portion 21 of the yoke 20. Another arm 58 may be secured to the same portion of the yoke on the opposite side of the center line of the machine and directed rearwardly and thence angularly to the left to bring its rear end adjacent the arm 57 to which it is rigidly secured, the arrangement being such that the bars 57 and 58 together form a substantially Y-shaped structure secured to the yoke at spaced points on opposite sides of the center line of the machine, movable with the yoke and adapted to communicate thereto, through the medium of the link 56, motion imparted to the yoke 47 about the pivot 50 through the medium of the stirrups 41.

For supporting the ground working tools suitable tool carrying gang bars are provided and arranged to provide two gangs disposed on opposite sides of the center line of the machine. Each gang comprises a pair of complementary gang bars 60 and 61 each preferably formed from a flat bar disposed with its greatest width in the vertical plane. While the gang bars may be of any suitable planular contour I prefer to make them substantially as shown in the drawing, in which the forward portion of each bar is shown as directed angularly inwardly toward the center of the gang for a suitable distance, then again directed parallel to the center line of the machine and finally directed sharply inwardly toward the center of the gang so that when the tools 63 are adjustably secured to the members by suitable clamps 64, the tools are so disposed in offset relation one behind the other as to effect the cultivation of a relatively large area by each gang. The members of each gang are suitably hinged together at their rearmost extremities preferably through the medium of hinge plates 65 and pivot bolts 66, the general arrangement of the gangs and of the tools carried thereby being well understood by those familiar with the art.

Adjacent its forward extremity each outer gang bar is preferably hinged on a hinge bolt 67 vertically disposed between the jaws of a yoke 68 provided at the rear end of a horizontally disposed L-shaped slide 69, while the inner bar of each gang is similarly hinged by a pivot bolt 70 to a yoke 71 provided at the rear end of a substantially similar L-shaped member 72. The forward end of each of the members 72 is turned inwardly and rigidly secured, as by bolts 73, to a rearwardly extending flange 74 carried by a collar 75 which surrounds the laterally directed portion 23 of the yoke 20 and is ordinarily disposed adjacent the vertical portion 22 thereof and prevented from longitudinal movement on the yoke by a clip 76 surrounding the yoke and abutting against the collar. The inwardly directed portion of each member 72 may, if desired, be made sufficiently long to provide room for a plurality of bolt holes for the reception of bolts 73 thus permitting lateral adjustment of the bar with respect to the collar by selecting different holes in the gang bar for the passage of the pivot bolt.

Each of the slides 69, as well as members 72, is preferably formed from a flat bar disposed with its greatest width in the horizontal plane, the inwardly directed portion of the slide being connected, as by bolts 80, between rearwardly directed horizontally disposed flanges 81 carried by a sleeve 82 slidable on the adjacent laterally directed portion of the yoke, the flange and sleeve thus forming a support for the inner end of the slide. Adjacent its outer end, each slide is supported preferably on a pair of anti-friction rollers 85 disposed in parallel relation beneath the slide and carried on the extremities of a piece of heavy spring wire bent to provide axles about which the rollers rotate. Between the forward ends of the rollers the wire is carried forwardly and upwardly over the adjacent portion of the yoke and bent down behind the same so as to contact with the inner edge of the boss 30 formed in the vertical portion 26 of the slide bar which latter lies between the portions of the wire passing around the yoke, the wire thus forming a clip 86, best shown in Fig. 4, carrying the anti-friction rollers 85 at its free ends and affording a somewhat yielding support to the slide 69 superposed on and movable over the rollers.

Each of the slide bars is connected by suitable means with the axle of the machine disposed substantially in the rear of that slide bar, said means in the form shown comprising preferably flat draft bars 90 and 91, the former extending from the upper side of the outer end of the axle to a point near the outer end and on the upper face of the slide bar, and the latter from the inner end of the axle to a point on the upper face and near the inner end of the slide bar, the draft bars being respectively secured to the slide bar by pivot bolts 93 and to the axles by similar bolts 94 and 95. Disposed beneath each draft bar 90 is a complementary draft bar 96 which extends angularly downward and forward from the under side of the outer end of each axle and is then directed horizontally forward so as to contact with the under face of the inwardly directed portion 27 of the slide bar, to which it is secured by bolts 98, it being of course understood that the draft bars 90 and 96 are movable about the pivot bolts 95 by means of which they are secured to the axle, and that the draft bars 91 are similarly movable about the bolts 94. If desired, the rear end of each of the bars 96 may be directed horizontally for a short distance so as to parallel the bars 90 and thus form a better bearing on the axle, the upper and lower surfaces of which are preferably milled off to form flat parallel bearing faces for the reception of the bars as clearly shown in Fig. 2, the upper surface of the inner end of each axle being also preferably similarly milled for the reception of the bars 91.

It will thus be seen that as the cultivator is drawn over the ground and the axles thus given a forward movement parallel to its surface, a similar movement will be directly imparted through the medium of the draft bars to the slide bars, thence to the lower parts of the yoke and in turn to the gang bars to move the latter forwardly in correspondence with the progress of the machine, but since the backward pull on the gang bars due to the engagement of the tools in the ground is relatively great and since the outer members of the gangs are supported adjacent the extremities of the slides 69, it is desirable to provide means for taking the thrust of these slides and for holding the latter in proper position, said means preferably comprising an anti-friction roller 100 positioned on a bolt 101 forming a vertical axis for the roller and extending between the draft bars 90 and 96 at such a point as to bring the surface of the roller closely adjacent or in contact with the rear edge of the adjacent transversely directed portion of the slide as most clearly shown in Figs. 4 and 5, the upper and lower ends of the bolt being securely fastened to the draft bars. The roller is preferably made of considerable length so that whatever be the vertically adjusted height of the slide with respect thereto, contact between the slide and roller may be effected.

The height of the rear end of each gang is preferably adjustably controlled through the medium of a hand lever 105 pivoted to a bracket secured to the member 4 or other convenient portion of the frame and cooperative through a suitable latch with a notched quadrant 106. Each lever is connected through a suitable link 107 with the rear end of the subjacent gang so that by elevating or depressing the lever the gang may be raised or lowered as desired, the gang bars during this operation rotating through the medium of sleeves 75 and 82 about the laterally directed portions of the yoke. Counterbalance springs 108 may be suitably interposed between each of the levers and a bracket connected to the frame member 1 for the purpose of counterbalancing to some extent the weight of the gangs while they are being raised.

For the purpose of effecting movement of each of the sleeves 82 along the laterally directed portions of the yoke, suitable means are provided, preferably comprising a hand lever 110 pivoted at a convenient point 111 on the frame and cooperative through a suitable latch with a notched quadrant 112 by means of which the lever may be latched in any desired position. The forward end of each lever is connected through the medium of a forwardly and downwardly extending link 114 with one arm 115 of a three armed lever 116, another arm of which, 117, is pivoted to one end of a laterally directed link 119, the opposite end of which is engaged in an eye 120 carried by the flange 81 of the sleeve 82. The third arm 122 of the lever is pivoted adjacent its extremity on a pivot bolt 124 which passes through an aperture positioned at a suitable point in a substantially V-shaped member 125 which forms a fulcrum for the lever, the arms of the member being secured to the upper face of the adjacent slide bar. Preferably the extremity of the arm 122 is bent over on itself so as to embrace the member and the pivot bolt passed through both portions of the arm and the member which lies between them, the arrangement of the various parts being such that movement of the lever 110 about its pivot 111 is effective to move the three armed lever 116 about the pivot 124 and thus, through the medium of the link 119, move the sleeve 82 along the laterally directed portion of the yoke and, in turn, the outer gang bar of the adjacent gang laterally inward or outward depending upon the direction of movement of the lever 110. Preferably the flanges 74 are elevated sufficiently to permit the members 72 to be secured to their under surfaces while the slides 69 are supported between flanges 81 in a slightly lower plane and at such height that the inner ends of the slides can, if necessary, pass beneath the inner ends of the members when the former are moved toward the extreme limit of their respective travel toward the center line of the machine.

For the purpose of attaching the cultivator to a tractor or other source of motive power in such manner that the draft of the latter will be properly communicated to the cultivator, I preferably provide a pair of inwardly and forwardly directed complementary arms 130, the rear ends of which are pivotally secured to the main frame adjacent the rear ends of the side members 2, the arms being provided with apertures adjacent their forward ends to facilitate their convenient attachment, as by a transversely extending bolt 132, to the beam A of a tractor or the like. Extending upwardly from the frame member 1 to meet each arm 130 at a point about midway of its length, is a hanger 135 which is bolted or otherwise rigidly secured to the frame member and provided with a plurality of apertures 136 adapted for the reception of a bolt 137 by means of which the hanger may be secured to the arm. It will be evident that as the point of attachment of the arms to the tractor is at a relatively fixed height from the ground, by utilizing different holes in the hangers for the passage of the bolts 137 the height of the forward portion of the frame of the cultivator and in turn, the height of the forward ends of the gang bars above the ground, may be varied within limits, the arms 130 moving slightly about their point of attachment to the tractor in correspondence with changes in this adjustment and the angular relation between the frame and the bars also changing slightly about the center formed by the bolts 140. Thus, the height of the forward ends of the gangs may be adjusted to suit varying operative conditions while, of course, the height of the rear ends thereof may be readily controlled through the levers 105.

The tractor beam A preferably supports a rearwardly extending hanger B carrying an operator's seat C positioned so as to permit the operator to conveniently reach the various control levers of the cultivator and to rest his feet on the stirrups 42 during operation.

In use under normal conditions the cultivator, having been suitably coupled to a tractor or the like, the proper height of the gangs determined through adjustment of the hangers 135, and the tools 63 also suitably adjusted for height, the gangs may be lowered into operative position by suitable manipulation of the levers 105. Thereafter if it becomes necessary during the operation of the machine to increase or decrease the width of either of the gangs, the same may be readily accomplished by manipulation of the levers 110, 110', depending on which gang it be desired to control. Movement of the lever 110, for example, is operative to cause movement of the three armed lever 116 on its side of the machine about its point of attachment to the member 125, whatever be the position of the yoke 20, and consequent movement of the link 119 to shift the sleeve 82 in or out along the yoke thereby moving the slide to decrease or increase the width of the gang. During this operation the sleeve 75 remains stationary on the yoke so that the gang bar 61 rotates slightly about the pivot 70, the pivot 66 moving to the right or left approximately one-half the distance through which the sleeve 82 is moved. In other words, the bolt 67 moves in or out the same distance as sleeve 82 and the pivot 66 moves in or out one-half that distance.

In the operation of the machine it is also frequently necessary or desirable to shift the gangs as a whole to the right or left in order to follow any curvature or sinuosity in the rows of plants, which operation is effected by suitable manipulation of the stirrups 41, 41', pressure on the former serving to shift the yoke and in turn both gangs to the left and pressure on the latter serving to shift them to the right. In effecting the latter movement, for example, the operator presses downwardly and forwardly on the foot rest 42' which brings the forward end of the stirrup forcibly against the rear end of link 45' and simultaneously swings the link 39' forwardly about its pivot. The movement of the link 45' serves to rotate the yoke 47 about the pivot 50 for an amount commensurate with the amount of movement of the stirrup, which movement is effective through link 56 and bars 57 and 58 to move the yoke to the right, carrying with it the slide bars and their connected mechanism, the sleeves 75 and 82 and the gang bars, whatever be the respective adjusted position of the sleeves 82, 82' on the yoke. During this movement of the yoke the draft bars 90, 91 and 96, 90', 91' and 96' swing simultaneously to the right or left as the case may be about their points of attachment to the axle, which of course results in moving the slide bars and their attached parts slightly rearwardly from normal position as the draft bars approach the extremities of their swing, but as the actual rearward displacement of the former is very slight owing to the flatness of the arcs described by the forward ends of the relatively long draft bars, the natural resiliency of the frame work readily compensates for and takes care of the rearward movement referred to.

It will be understood that so long as the pressure is maintained on the foot rest 42' the yoke will be retained in the position to which it has been shifted and that upon a release of pressure on the foot rest 42' and application of pressure to the rest 42 through the medium of the operator's left foot, the yoke may be brought back to central position or shifted to the left thereof as may be desired, the operation of shifting the yoke being readily performed without undue effort as the weight thereof together with that of the attached parts is supported on the anti-friction rollers 25, 25'.

It will further be understood that under certain circumstances if the rear ends of the gangs be elevated or depressed considerably above or below the horizontal plane, the rear edges of the slides 69 will be moved out of contact with the rollers 100 as these edges travel in an arc of which the axis of the laterally directed portions of the yoke is the center when the rear ends of the gangs are raised or lowered, and hence, were it not for the flexibility of the framework and play and looseness which is inherent between the parts in all types of agricultural machinery of this general character, the rollers might not under these conditions be effective to perform their sole duty, namely, to take the thrust of the slides, but by reason of the flexibility, play and looseness referred to and the very small distance which the slides are moved away from the rollers when the gangs are elevated or depressed, it is found in practice that the pull of the gangs is sufficient in all possible positions of the slides to effect contact of their rear edges with the rollers and thus enable the latter to perform their function.

It will be noted that while for convenience, the operations of adjusting the width of the gangs and of shifting them to the right or left have been separately described herein, they may be, and frequently are, simultaneously performed under operative conditions; that whatever be the position to which the yoke has been brought through the manipulation of the stirrups, the adjustment of the gangs to increase or decrease their width may be readily effected, and that furthermore the gangs may be freely raised and lowered by the levers 105 and 105' and the adjustment of the height of the forward ends of the gangs effected when desired through the medium of the hangers 135, 135' without disturbing the adjustment of or cramping or binding the other portions of the machine, so that the various movements, adjustments and operations necessary or desirable for effecting close, accurate and adequate cultivation of the rows of growing corn, beets or other plants may be effected easily and with the requisite precision.

While I have herein described with considerable particularity a preferred embodiment of my invention, I do not thereby desire or intend to limit myself solely thereto as suitable changes and modifications may be made in the form, construction and arrangement of the various parts and in their method of assembly without departing from the spirit and scope of the invention as defined in the appended claims.

Having thus described my invention I claim and desire to protect by Letters Patent of the United States:

1. In a cultivator the combination with a frame, axles supported below the frame and wheels rotatable on the axles, of a yoke having a central portion adjacent the frame, portions depending downwardly therefrom and laterally outward oppositely directed portions adjacent the ends thereof, means for effecting lateral movement of said yoke with respect to said frame, a slide bar positioned adjacent each of said outwardly directed portions and carried by the yoke, means for supporting said slide bars from the frame, a plurality of horizontally disposed draft bars extending between said slide bars and said axles operative to maintain said bars spaced from said axles and in front thereof, a plurality of tool carrying gangs each having relatively movable members supported from the outwardly directed portions of the yoke, and means operative to move one of the members of each gang laterally with respect to said yoke.

2. In a cultivator the combination with a frame, axles supported below the frame and wheels rotatable on the axles, of a yoke having a central portion adjacent the frame, portions depending downwardly therefrom and laterally outward oppositely directed portions adjacent the ends thereof, means for effecting lateral movement of said yoke with respect to said frame, a slide bar positioned adjacent each of said outwardly directed portions and carried by the yoke, means for supporting each of the slide bars from the frame comprising a hanger secured to the frame and anti-friction means carried by the hanger and positioned beneath the slide bar, a plurality of draft bars extending between each slide bar and the adjacent axle and movable with respect thereto on vertical pivots, a plurality of tool carrying gangs each having relatively movable members, adjustable means for supporting the rear end of each gang from the frame, means for operatively supporting one of the members of each gang in laterally fixed relation with respect to the adjacent outwardly directed portion of the yoke, means for movably supporting the other member of the gang from said portion of the yoke comprising a sleeve slidable on the yoke and a slide carried by said sleeve and connected to said member, means carried by the adjacent slide bar operative to vertically support said slide, and manually operable means for moving said sleeve relatively with respect to said yoke to increase or decrease the width of the gang.

3. In a cultivator the combination with a frame, axles supported below the frame and wheels rotatable on the axles, of a yoke having a central portion adjacent the frame, portions depending downwardly therefrom and laterally outward oppositely directed portions adjacent the ends thereof, means for effecting lateral movement of said yoke with respect to said frame, a slide bar positioned adjacent each of said outwardly directed portions and carried by the yoke, means for supporting each of the slide bars from the frame comprising a hanger secured to the frame and anti-friction means carried by the hanger and positioned beneath the slide bar, a plurality of draft bars extending between each slide bar and the adjacent axle and movable with respect thereto on vertical pivots, a plurality of tool carrying gangs each gang having relatively movable members, adjustable means for supporting the rear end of each gang from the frame, means for operatively supporting one of the members of each gang in laterally fixed relation with respect to the adjacent outwardly directed portion of the yoke, means for movably supporting the other member of the gang from said portion of the yoke and comprising a sleeve slidable on the yoke and a slide carried by said sleeve and connected to said member, anti-friction means carried by said slide bar and vertically supporting said slide, means disposed in the rear of said slide operative to support said slide against the pull of the gang and manually operable means for moving the sleeve along the yoke in either direction to increase or decrease the width of the gang.

4. In a cultivator the combination of a frame, an axle supported beneath the frame, a yoke having a central portion disposed adjacent the frame, downwardly depending portions and laterally outwardly directed portions adjacent the ends thereof, a slide bar carried by said yoke adjacent each outwardly directed portion, means for supporting said slide bars from said frame, a gang having relatively movable members extending rearwardly from each of said outwardly directed portions and disposed below the horizontal plane of the axle, means extending between said axle and said slide bar operative to maintain said bar spaced in front of said axle, means for supporting the forward ends of the members of the gang from the outwardly directed portion of the yoke and manually operable means for moving one of said members longitudinally with respect to the yoke.

5. The combination with a cultivator having a frame, an axle supported beneath said frame and a wheel supported on said axle, of means for effecting a draft connection between said frame and a tractor or the like comprising a pair of complementary bars pivoted to said frame adjacent their rearmost extremities and converging forwardly to a point convenient for attachment to the tractor, and a hanger extending from each of said bars to said frame operative to vertically support said frame from said bar when said bar is operatively connected to the tractor.

6. The combination with a cultivator having a frame, an axle supported beneath the frame and a wheel supported on the axle, of means for effecting a draft connection between the cultivator and a tractor or the like comprising a pair of complementary bars pivoted adjacent the rear portion of said frame and converging forwardly to a point convenient for attachment to the tractor, and a vertically adjustable hanger extending between each of said bars and the forward portion of the frame and operative to support said frame in operatively fixed angular relation to said bars.

7. The combination with a cultivator having a frame, an axle supported beneath the frame and a wheel supported on the axle, of means for effecting a draft connection between the cultivator and a tractor or the like comprising a pair of complementary bars pivoted adjacent the rear portion of said frame and converging forwardly to a point convenient for attachment to the tractor, and means for supporting the forward portion of said frame in operatively fixed vertical relation with said bars, said means comprising a vertically adjustable hanger extending between the forward portion of the frame and each of said bars, adjustment of said hangers with respect to said bars being operative to effect a movement of said frame with respect to said bars about their points of attachment thereto as a center.

8. The combination in a cultivator having a rearwardly extending tool carrying gang having relatively movable members, of means operative to support the forward end of one of said members, comprising a slide connected to said member, means for affording vertical support to one end of the slide, means for supporting the other end of the slide and anti-friction means disposed in the rear of the slide and operative to contact therewith to resist the rearward pull of the member when said cultivator is in operation.

9. The combination in a cultivator having a rearwardly extending tool carrying gang having relatively movable members, of means operative to support the forward end of one of said members comprising a laterally movable slide connected to said member, anti-friction means disposed below the slide and operative to afford vertical support thereto, means for supporting the other end of the slide, and anti-friction means comprising a vertically positioned roller disposed in the rear of the slide and operative to contact therewith to resist the rearward pull of the member when the cultivator is in operation.

10. In a cultivator the combination of a frame, an axle supported beneath the frame, a supporting member, a slide bar fixed with respect to said member, draft bars connecting the slide bar and the axle, means for vertically supporting the slide bar from the frame, and foot operated means for effecting lateral movement of the member with respect to the frame.

11. In a cultivator the combination with a frame, an axle supported beneath the frame, a yoke, a slide bar fixed with respect to the yoke and carried thereby, draft bars connecting the slide bar and the axle, means for vertically supporting the slide bar from the frame, a tool carrying gang comprising relatively movable members, means for supporting said members from said yoke, and permitting lateral movement of one of said members on the yoke, manually operable means for effecting said movement and foot operated means for effecting lateral movement of the yoke with respect to the frame.

12. In a cultivator the combination of a frame, an axle supported beneath the frame, a yoke, a slide bar fixed with respect to the yoke and carried thereby, draft bars connecting the slide bar and the axle, means for vertically supporting the slide bar from the frame, a tool carrying gang comprising relatively movable members, means comprising a pair of sleeves for supporting the forward end of the members of said gang from said yoke one of said sleeves being operably slidable thereon, manually operable means for moving said sleeve in and out along said yoke, an L-shaped slide connecting said sleeve with one of the members of the gang, means connecting the other member of the gang with the other sleeve, anti-friction means operative to afford vertical support to said slide, and means in the rear of said slide adjacent thereto operative to resist the pull of said gang when said cultivator is in operation.

In witness whereof, I have hereunto set my hand this 2nd day of April A. D. 1921.

CHARLES J. ALLEN.